Jan. 8, 1957   J. D'A. CLARK   2,776,687
CROSSCUT FIBER AND METHOD FOR ITS PREPARATION
Original Filed March 23, 1953   3 Sheets-Sheet 1
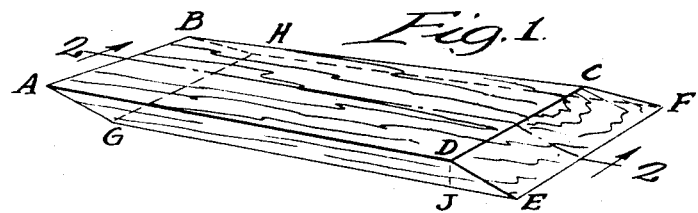
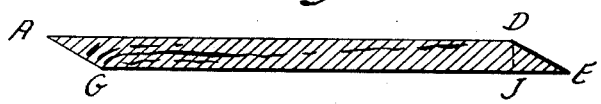
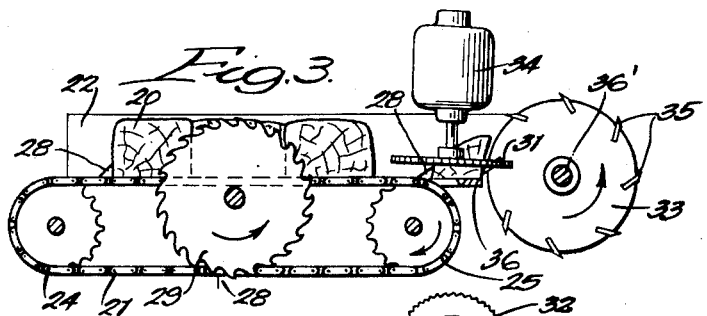
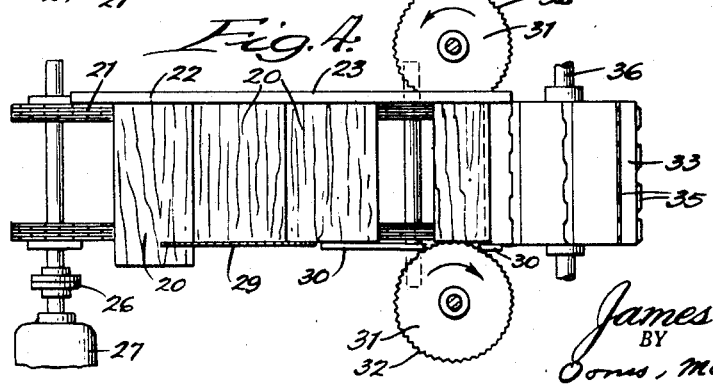
INVENTOR:
James d'A. Clark,
BY
Dones, McDougall, Williams Hersh
ATTORNEYS.

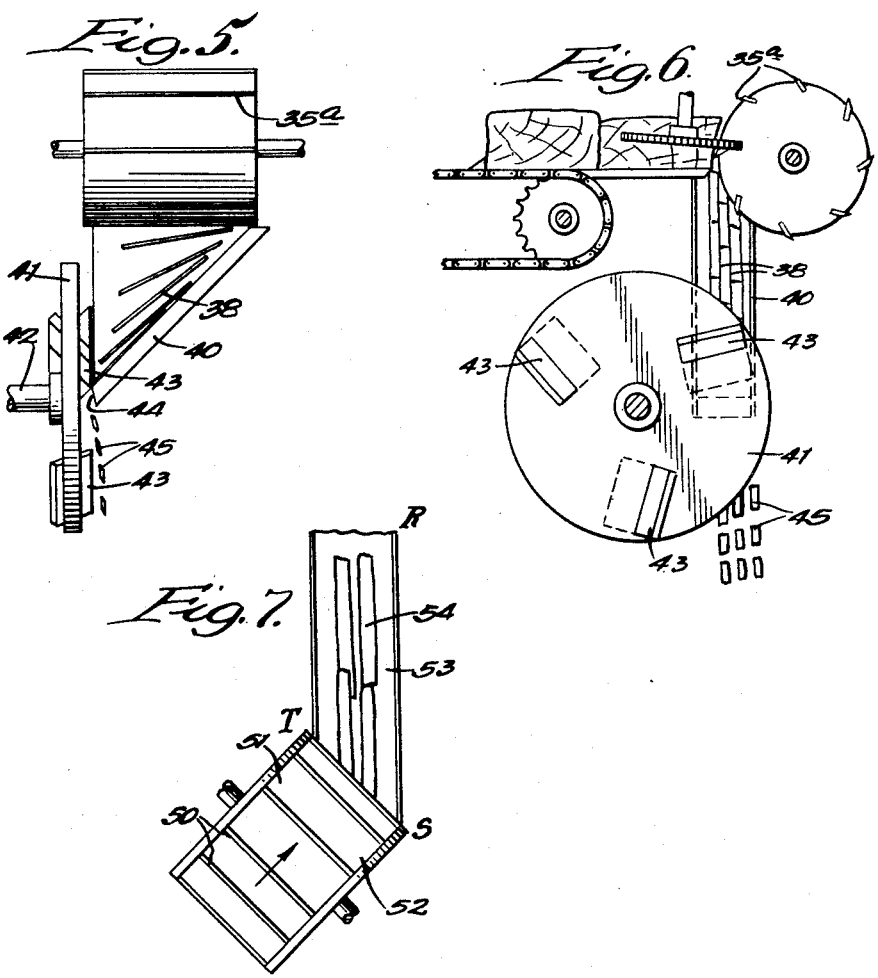

Jan. 8, 1957　　　　　J. D'A. CLARK　　　　　2,776,687
CROSSCUT FIBER AND METHOD FOR ITS PREPARATION
Original Filed March 23, 1953　　　　　3 Sheets-Sheet 3

INVENTOR:
James d'A. Clark,
ATTORNEYS.

United States Patent Office 2,776,687
Patented Jan. 8, 1957

2,776,687

CROSSCUT FIBER AND METHOD FOR ITS PREPARATION

James d'A. Clark, Victoria, British Columbia, Canada

Original application March 23, 1953, Serial No. 344,089. Divided and this application July 18, 1956, Serial No. 598,705

4 Claims. (Cl. 144—309)

This invention relates to a new and improved wood particle and it relates particularly to a woody fibrous element and method for manufacturing same, and to a consolidated product manufactured therefrom and method for manufacturing same.

This is a division of my copending application Serial No. 344,089, filed March 23, 1953, and entitled "Crosscut Fiber and Method for Its Preparation."

In Patent No. 2,689,092, description is made of the manufacture of a fiber flake or wafer cut crosswise tangentially to the grain of the wood and having end faces formed at right angles to the sides and to the top and bottom faces of the wafer. Unless such flakes or wafers are cut undesirably thin, the abrupt vertical end faces of the wafers cause undesirable zones or lines of weakness throughout the structure molded therefrom. This is particularly evident with harder woods and woods having hard summer wood annual rings, such as are found in southern pines. Moreover, on the broad faces of well compacted structures molded therefrom and particularly where the end of one wafer overlaps the faces of another, there exists an undesirable linear depression which not only constitutes a line of weakness upon flexure but presents an unattractive appearance and provides a crevice wherein dirt may lodge. The side portions of flakes of this type do not present the same difficulties because the side surfaces are predominantly parallel to the annual rings which are usually at an acute angle to the broad surfaces. Further, by being parallel to the grain, the side faces and edges are more pliable laterally than are the end faces and edges. Consequently, the juncture between the side edges and the underlying element does not become obvious nor objectionable in the molded structure.

An object of this invention is to provide an improved wood fiber or flake suitable for manufacturing molded fibrous products.

Another object is to provide fibers or flakes of woody material characterized by their ability to form a smooth, continuous unbroken surface and which become well joined with underlying fibrous elements during molding into a consolidated product.

A further object is to provide a method for producing wafers suitable for forming into strong and attractive consolidated products by the use of brittle woody material, such as kiln dried lumber.

Another object is to provide a method of producing woody flakes or wafers of predetermined thickness and length with ends of the flakes tapered or wedge shaped.

A still further object is to produce a strong consolidated fibrous product of high density having a substantially unbroken surface by the use of woody flakes or wafers advantageously shaped and thinly coated with resinous material.

These and other objects and advantages of this invention will hereinafter appear and for purposes of illustration, but not of limitation, an embodiment of the invention is shown in the accompanying drawings, in which:

Figure 1 is a perspective view of a woody flake produced in accordance with this invention;

Figure 2 is a sectional view taken along the line 2—2 of Figure 1;

Figure 3 is a schematic side elevational view of an apparatus which may be used in preparing flakes in accordance with this invention;

Figure 4 is a plan view of the apparatus shown in Figure 3;

Figure 5 is an elevational view showing a modification in the apparatus of Figure 3 which may be used in the manufacture of flakes in accordance with this invention;

Figure 6 is an end view of the elements shown in Figure 5;

Figure 7 is an elevational view of a further modification which may be embodied in the apparatus shown in Figure 3;

Figure 8:
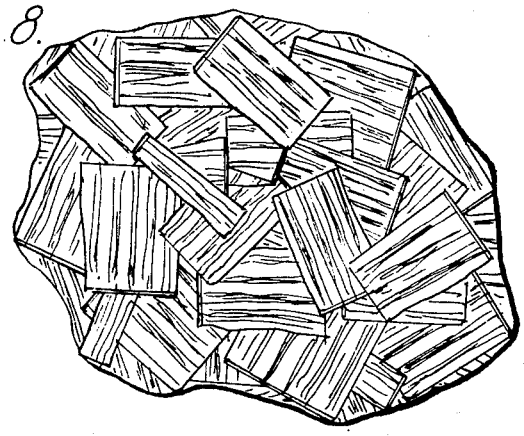
Figure 8 is a fragmentary view of the surface of a composite fibrous structure, made of wafers having their end edges perpendicular to the sides.

In accordance with this invention, wafers or flakes are cut from a wooden block by cutting into the block of wood parallel to the length of fibers in the wood preferably by feeding the block of wood towards a moving cutting edge substantially perpendicularly to its path and with a cutting movement transverse said length to form wafers having a thickness corresponding to the depth of cut by scoring the wood with angular cuts in the direction of cutting movement. For this purpose, wafers or flakes are cut from a wooden block by knife elements which are arranged substantially parallel to the length of the fibers during cutting operations to form the broad faces while the end faces are severed at acute angles with the broad faces to impart the desired taper and flexibility to the ends for the purpose of enabling the manufacture of a strong, smooth-faced consolidated product. By feeding the block perpendicularly to the path of the cutting edge the wafers or flakes produced will have parallel broad faces.

As shown in Figures 3 and 4, a succession of wooden blocks 20 having at least one end squared is positioned on two endless chains 21 with the squared end 22 abutting the side wall 23. Each conveyor chain 21 is endless and passes over an idler sprocket 25 at one end and a drive sprocket 24 at the other, the latter of which is driven through a friction clutch 26 by a variable speed motor 27. Dogs 28 spaced along the length of the chain 21 function in a manner to advance the wooden blocks 20 past a circular saw member 29 which severs the block to predetermined length so as to enable further passage with the chains between side walls 23 and 30.

A pair of horizontally disposed downwardly inclined disk members 31 having serrated or toothed edges 32 extend through a slot in the side wall members 23 and 30 beyond the idler sprocket 25 so as to compress and grip the ends of the block 20 therebetween as it is fed to them by the chain 21 and advance them toward a cutting drum 33. The disk members 31, rotated by a variable speed driving motor 34, take over the feed of the wooden block toward the cutting knives 35 peripherally arranged about the cutting drum 33.

With the feed wheels or disks 31 located immediately in advance of the cutting wheel 33 and in constant engagement with the wooden block while it is being cut and, with the downward slant of the disk, a steady feed rate of variable speed is secured without chatter or excessive vibration which would otherwise occur if the feeding of the block were performed by the dogs on the belt. The downward slant of the disks ensures that the block is kept firmly pressed against the bed plate 36, because the teeth in the disks thereby bite downwardly as well as inwardly, as the blocks are fed forward.

The cutting drum 33 is rotatably mounted on the shaft 36' which is adapted to be driven at variable speed from a power source (not shown). A plurality of knife elements 35 are substantially equidistantly arranged about the periphery of the wheel with the cutting edges extending from the surface thereof to effect severance of the block into wafers or slivers of the type which will hereinafter be described. By the proper selection and arrangement of knife elements, it has been found possible to sever wafers of predetermined contour in a single operation by the cutting drum 33 or else, if the knife elements are formed with flat edges of the type embodied in the cutting wheel of Figure 5, slivers of normal contour will be produced for a subsequent severance into shorter lengths having the desired end arrangements by additional cutting operations.

In Figures 5 and 6, the knife elements 35a are arranged crosswise of the drum 33 in substantially equidistantly spaced apart relation about the surface thereof. The blades are straight edged so that slivers 38 produced thereby are of substantially the length of the wooden blocks. The desired acute angularity of the end portions is achieved by feeding the cut slivers 38 lengthwise down an inclined chute 40 to an auxiliary cutting element in the form of a disk 41 which is adapted to be rotated by shaft 42. Projecting from the end wall of the disk 41 are a number of laterally disposed knife elements 43. The distance by which the knife elements project from the face of the disk 41 may be adjusted by endwise movement with respect thereto. The knife elements 43 cooperate with the bed knife 44 at the lower end of the chute 40 to sever the slivers 38 into wafers 45 and since the slivers are fed at an acute angle, preferably 45 degrees or less with the cutting disk 41, the cut end faces will have a correspondingly angular relationship with the broad faces. The disk 41 with its knife elements may be mounted obliquely with respect to the chute to provide more taper to the end faces. Instead of causing the slivers to feed downwardly in the chute by gravitational force, they may be positively conveyed by a belt or by the assistance of vibrational feeding elements or the like. The length of wafer will depend upon the rate of feed of the slivers 38 as well as the rotational speed of the cutting disk 41. However, as is preferable, the cutting speed is sufficiently slow to permit the leading edge of the sliver to engage the disk wall, so that the length of the wafers may be controlled by the distance which the cutting edges of the knives 43 project from the disk wall.

In a further modification, illustrated in Figure 7, a plurality of cutting knives 50 having substantially straight edges are arranged about the edge portions between a pair of spaced rotatable disk members 51 and 52 to form a cutting wheel assembly. The knife elements 50 cooperate with the bed knife at the base of a chute 53 to effect the desired severance of slivers 54 to desired length. By arranging the axis of the cutting wheel at a predetermined angle with the oncoming slivers and by arranging the bottom of chute 53 at an angle to the plane which the cutting edges make with the bed plate, predetermined tapers in the sidewise as well as in the vertical direction may be achieved in the end face of the wafer. The length of wafer so produced depends upon the speed of the cutting wheel and the number of knives located therein as well as the rate of feed of the slivers to the cutting wheel.

Wafers or elements produced in accordance with this invention, exemplified in Figures 1 and 2, have wedge-shaped ends formed by end faces ABHG or CDFE, a controlled thickness DJ, length AD and width DC, the end faces making an acute angle DAG or DEG with the top and bottom faces ABCD or HFEG. The end edges DC or AB may be made with any desired angle ADC to the side edges AD by providing the required angle RST in Figure 7 between the cutter and chute.

In general, the side faces ADEG and BDFH will be neither flat nor exactly parallel to the length of the fibers because they will usually constitute fractured surfaces along natural striae as those between the annual rings in wood. However, either face may have been a part of the outer face of the billet of wood from which the wafer was cut. This absence of parallelism or regularity between the pairs of side faces of the majority of the wafers and the parallelism of each side face with the adjacent annual ring in the wood, serves in part to distinguish wafers made in accordance with this invention from others. For example, it is understood that thin decorative wafers have been sliced obliquely from the end of a stick of wood with the grain running the short way. In such a case, except for inadvertent fractures the end and side faces of the wafers so made will comprise parts of the four outer flat faces of the original stock of wood from which they were cut.

When the broad top and bottom surfaces of the wafers have been cut with a knife edge lying parallel to and moving across the direction of the fibers as herein described, the original strength of the fibrous elements in the woody structure is preserved almost intact. If, on the other hand, the cutting edge lies at an angle to or moves in other than a direction substantially perpendicular to the axial direction of the fibers, the resulting wafers, especially if cut from air dry wood, will be more or less checked or cracked across the grain, as is very evident with ordinary planer shavings. The direction in which the faces of fibers have been cut may be determined from microscopic observation, by seeing in which direction lie the scratches made by imperfections in the cutting edges and the direction in which microscopically small fibrous elements have bent while being cut.

Elements or wafers made in accordance with this invention, having a thickness of upwards of 0.002 inch, from 1.0 to 2.0 inches long and of various widths, are particularly suitable for use in preparing a composite molded fibrous structure. This is preferably accomplished by dusting or mixing the wafers with a small percentage of finely powdered thermo-active resin, such as phenol formaldehyde, urea formaldehyde, melamine formaldehyde and the like curable thermo-setting resins in an intermediate stage of polymeric growth, and felting the resulting resinous coated wafers into a mat, such as is described in my copending application Ser. No. 110,212, filed August 13, 1949, now Patent No. 2,698,271. The desired resinous concentration in uniform distribution on the surfaces of the wafers can also be accomplished by treating the fibrous elements with resinous solution and dispersion and drying before felting or by the addition of such bonding agents in combination with the felting operation. When using dry powdered resin with wafers of the type described, it has been found that from 2–4 percent resin will produce molded boards having strength properties which are considerably greater than that heretofore secured with 10–40 percent by weight resin added to conventional fine wood fibers or to sawdust. The amount of resin required for molding into a composite board is dependent upon the thickness of wafers and the density of the wood of which they are formed but with the thicker wafers more than 3 percent by weight resin is seldom if ever required. It is believed more accurate to define the resin concentration in relation to the amount present per unit area of fiber surface because of the variation in proportion to the thickness and the density of the wafer. Under such circumstance it has been found that amounts within the range of 1/10–1 pound dry resin per 1000 square feet of surface area is sufficient for consolidation to produce boards, which is only a small fraction of the amount heretofore required to produce a molded board of comparable strength with materials of the prior art. Further increases in the amount of resin are not necessary because it does not proportionately increase the strength of the molded product.

Figure 9:
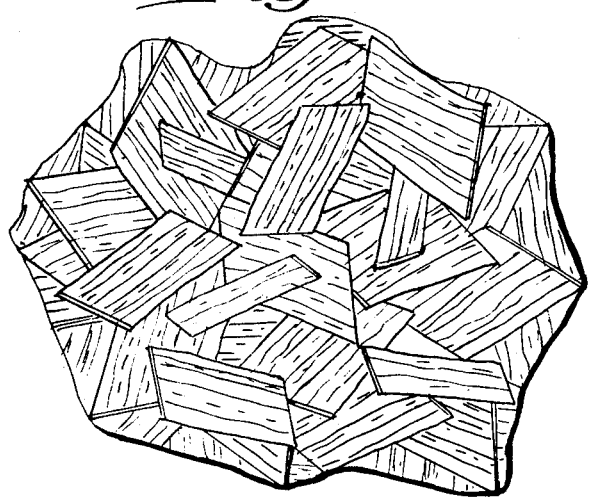
Figure 9 is a fragmentary view of a composite fibrous structure made with wafers having end edges at an oblique angle with the sides.

By way of example, wafers about 0.015 inch thick made in accordance with this invention from a moderately hard wood like Douglas fir are dusted with 3 percent by weight of phenolic resin (minus 200 mesh) (about 0.52 pound per 1,000 square feet of surface area). The resinous coated wafers are felted into a mat and consolidated under pressure of 500 p. s. i. for 5 minutes at 320° F. A ¼ inch board having a density of 1.0 and a modulus of rupture of over 7000 p. s. i. is obtained. If a polished caul is used during the consolidation of molding of the board, the face of the board formed against it is characterized further by having a smooth, glossy surface unmarred by linear depressions at the ends of the wafers. The board is further characterized by substantially all of the visible wafers having their side edges parallel to the grain of the wood, as shown in the fibers by the fragmentary plan views of the boards in Figures 8 and 9.

If the knives cutting the wafers to length are dull, the end edges of the wafers will be ragged. This ragged or scalloped effect of the end edges is often achieved when the surface lamina of a structure composed of wafers having sharp straight end edges, is sanded. Removal of the surface by sanding, of course, removes also the resinous glossy surface.

Particularly when the wafers are cut from hard wood or wood having dense summer wood rings, wafers having ends tapered in thickness give a stronger and considerably smoother surfaced board than do wafers having blunt ends. Furthermore, this tapering of the ends permits a thicker wafer to be used than if the ends were not tapered. In consequence, the specific surface of the fibrous material is reduced and with this proportionately the quantity of resinous binder necessary to make a board having a required strength.

By permitting the knives on the sliver cutters to protrude only a little more from the face of the cutter than the thickness of the slivers to be cut, when the side end of a billet of wood is reached, there is comparatively little disturbance to the cutting. By positively feeding the billets of wood to the cutter as close as possible to it as herein disclosed, not only is the thickness of unsupported side ends of the billets reduced to a minimum, but the absence of the springiness between the cutter and the feeding means of a comparatively long length of wood or pieces of wood, markedly improves the uniformity of thickness of the slivers and their smoothness of surface. Both these improvements result in an appreciable reduction in the quantity of resin and sizing necessary for making a structure of a required strength and resistance to liquids.

It is to be understood that the apparatus shown and described is to be taken as exemplary only of the method disclosed for producing an improved wafer of high quality and at a comparatively low cost from pieces of woody material that otherwise might be of little value.

It will be further understood that numerous changes may be made in the details of construction, arrangement and operation of the apparatus without departing from the spirit of the invention, especially as defined in the following claims.

I claim:

1. The method of producing fibrous wafers of the type described, including the combination of steps of cutting a block of wood parallel to the lengths of the fibers in the wood with a cutting movement transverse said lengths to form wafers having a thickness corresponding to the depth of cut and tapering the end walls of the wafers with respect to their thickness by cutting the wafers subsequent to their formation with a cutting movement crosswise of the lengths of the fibers and angular with the broad faces of the wafers to sever the wafers into shorter lengths with angular end walls.

2. The method of producing fibrous wafers as claimed in claim 1 in which the wafers are cut into lengths of 0.5 to 5 inches.

3. The method of producing fibrous wafers as claimed in claim 1 in which the wafers are cut into lengths of 0.5 to 2.0 inches.

4. The method of producing wafers as claimed in claim 1 in which the block of wood is advanced substantially perpendicularly to the direction of cutting movement whereby the wafers are cut with substantially parallel broad faces.

References Cited in the file of this patent

UNITED STATES PATENTS

| | | |
|---|---|---|
| 1,883,876 | Brown | Oct. 25, 1932 |
| 2,751,947 | Wyss | June 26, 1956 |